PHASE INVERTING DIRECT CURRENT AMPLIFIER CIRCUIT
Filed June 4, 1963 2 Sheets-Sheet 1

INVENTORS
LEO F. SLATTERY
LYNN W. GALLUP
HENRY W. SCHOENHERR
BY Cushman, Darby & Cushman
ATTORNEYS Jan. 17, 1967 L. F. SLATTERY ET AL 3,299,363

PHASE INVERTING DIRECT CURRENT AMPLIFIER CIRCUIT

Filed June 4, 1963 2 Sheets-Sheet 2

INVENTORS

LEO F. SLATTERY
LYNN W. GALLUP
HENRY W. SCHOENHERR

BY Cushman, Darby & Cushman
ATTORNEYS

United States Patent Office 3,299,363

Patented Jan. 17, 1967

3,299,363

PHASE INVERTING DIRECT CURRENT AMPLIFIER CIRCUIT

Leo F. Slattery, St. Paul, and Lynn W. Gallup and Henry W. Schoenherr, Minneapolis, Minn., assignors to Control Data Corporation, Minneapolis, Minn., a corporation of Minnesota Filed June 4, 1963, Ser. No. 285,493
3 Claims. (Cl. 328—209)

This invention relates to a bi-level inverter circuit and more particularly to a phase inverting direct current amplifier in which each of two output levels is precisely defined by means of internal feedback via an input network and possessing two distinct voltage levels.

Previous methods known in the art for successfully obtaining electrical circuits capable of bi-level operation include the use of two amplifiers wherein one amplifier is electrically connected to the other by positive feedback through appropriate impedances. The conditions of operation are such that either one amplifier or the other is conducting at any instant of stable operation. Since two conditions of stability exist, the circuit has a bi-level output voltage. The bi-level output voltage is such that if one amplifier output voltage is at a high level the other amplifier output voltage is at a low level. When the circuit changes from one stable state to the other, the output voltages then become the reciprocals of each other, that is the high output voltage becomes a low output voltage and the low output voltage becomes a high output voltage.

Another known bi-level device comprises a single amplifier wherein the electrical circuit parameters are selected so that with positive feedback the voltage-current characteristic curve of the amplifier is S shaped. This S-shaped curve is such that a portion of the curve has a negative slope bounded on each side by portions of the curve having positive slope. Therefore this circuit exhibits negative resistance properties in the portion of the curve having a negative slope. The intersections of the load line with the characteristic curve result in two stable points of operation wherein the output voltage of one stable point is high and the output voltage of the other stable point is low. As the amplifier is changed from one stable state to the other, the output voltage becomes the reciprocal of the prior output voltage resulting in bi-level output voltages.

Other bi-level devices comprise using an amplifier in class C operation wherein two levels are obtained by operating in the cutoff and saturation portions of the amplifier's voltage-current characteristic curve, thus resulting in a bi-level amplifier having high and low levels of output voltages.

A pending patent application Serial Number 771,428 filed on November 3, 1958 by Seymour R. Cray entitled Bi-Level Amplifier and Control Device, now issued as Patent 3,092,729, sets forth the use of a bi-level amplifier comprising a transistor amplifier with direct current negative feedback circuitry. The operation of the amplifier within its bi-stable states, resulting in bi-level operation, is dependent upon the input to the transistor amplifier. A first voltage level output is obtained when the transistor is operated at a first point on its dynamic characteristic curve; and a second voltage level is obtained when the transistor is operated at a second point on its dynamic characteristic curve, the transistor conducting at all times.

It is therefore an object of this invention to provide improved means for establishing an input threshold operating voltage level for the bi-level inverter circuit.

It is another object to immediately stabilize the bi-level inverter circuit output voltage at one or the other quiescent value.

Yet another object of this invention is to provide an arrangement for clamping the output signal voltage level to thereby eliminate overshooting.

A further object of this invention is to provide a circuit which will thus maintain the output terminal at one or the other of two precisely determined output voltages.

Further objects and the entire scope of the invention will become more fully apparent when considered in light of the following detailed description of illustrative embodiments of this invention and from the appended claims.

The illustrative embodiments may best be understood by reference to the accompanying drawings within:

Figure 2:
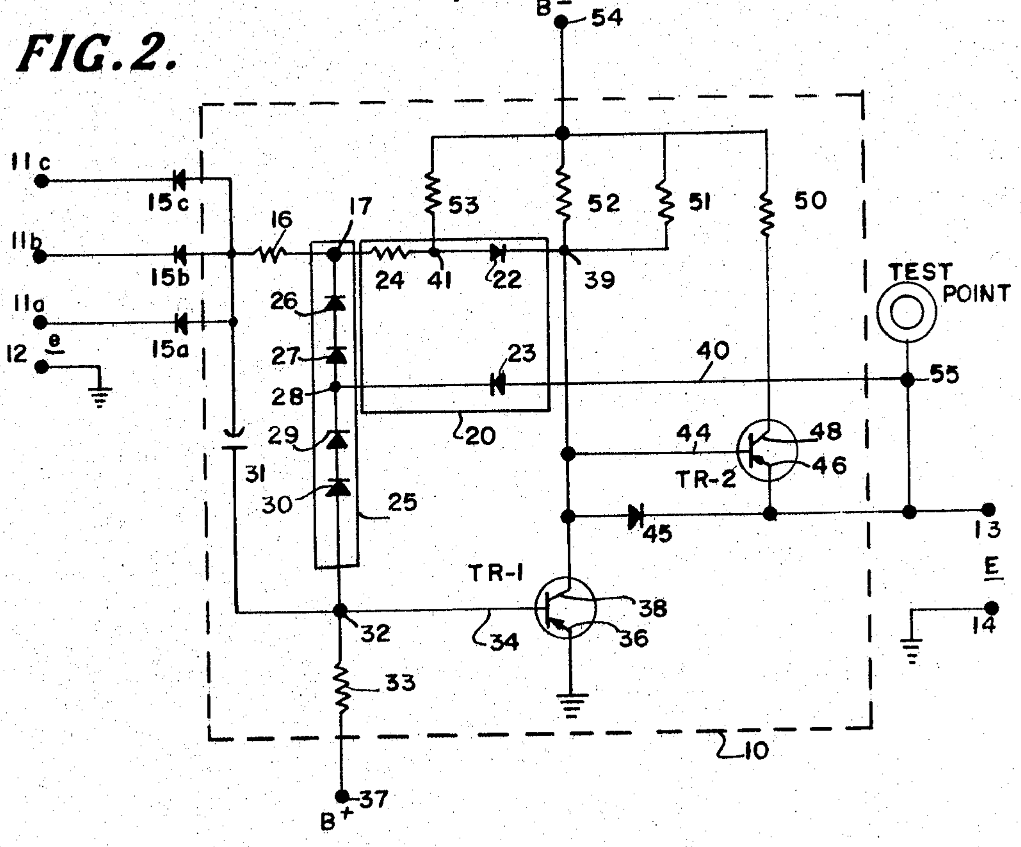
FIGURE 2 is a circuit diagram of a preferred embodiment of this invention including the non-linear input network and input coupling diodes.
Figures 3, 4:
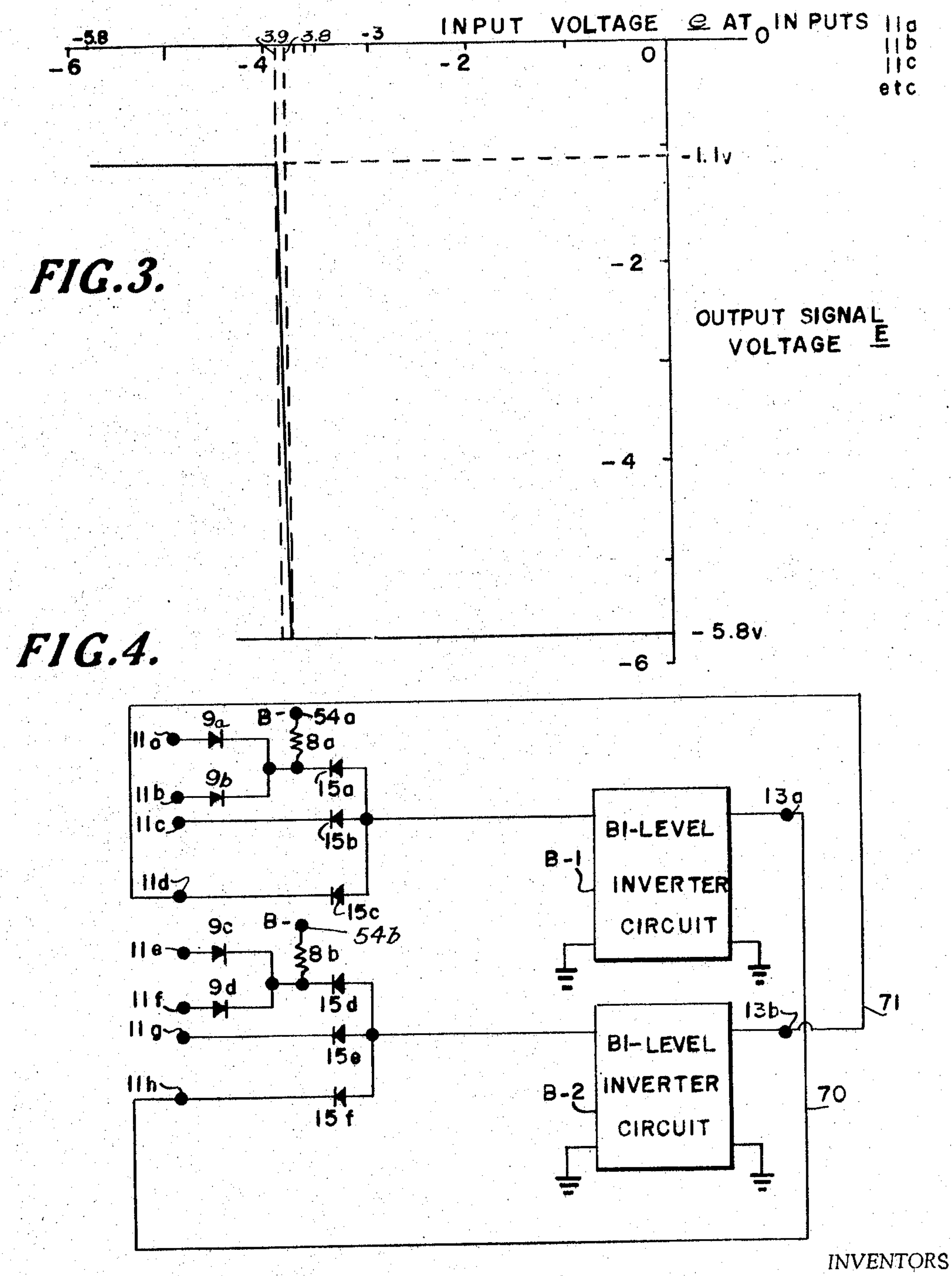

FIGURE 3 graphically illustrates the input-output characteristics of the circuit of FIGURE 2; and FIGURE 4 is a schematic diagram of two circuits of this invention coupled to form a bi-stable flip-flop wherein the inputs to each circuit comprise diode means for performing cascaded logical operations.

The inventive bi-level inverter circuit includes a non-linear input network comprising non-linear diodes. This non-linear input network establishes a relatively constant operating voltage upon a phase inverting amplifier whereby the input voltage signal must exceed the established relatively constant operating voltage before the circuit will respond to the input signal. The said input network also provides a non-linear input to the phase inverting amplifier whereby feedback from the circuit can be applied to the input of the amplifier to influence its operation. The non-linear input network also provides regulation of the output signal by compensating circuit operation as a function of the output signal variation.

Figure 1:
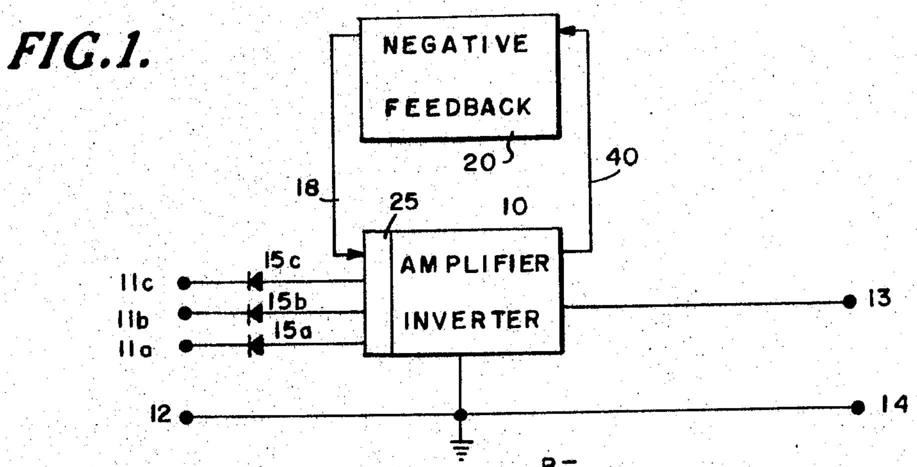
FIGURE 1 is a block diagram illustrating the basic bi-level circuit of this invention having input coupling diodes.

FIGURE 1 illustrates by means of a block diagram the over-all circuit which includes the inventive improvement. The over-all circuit comprises amplifier-inverter 10 and a non-linear negative feedback circuit 20. When an input signal is applied between either 11*a*, 11*b* or 11*c* input diodes and ground terminal 12, an output signal will appear between output terminal 13 and ground terminal 14. Hereinafter signals applied between the input terminals 11*a*, 11*b* or 11*c* and ground terminal 12 are defined as inputs while that voltage appearing between output terminal 13 and ground terminal 14 will be defined as an output. A portion of the output signal is fed back via line 40 to the negative feedback circuit 20, wherein the output of the negative feedback circuit is applied to the non-linear input network 25, via line 18, which network then applies the feedback signal to the amplifier-inverter 10.

FIGURE 2 illustrates a preferred embodiment of the bi-level inverter circuit shown in FIGURE 1. The amplifier and inverter elements employed therein are PNP type transistors. It is anticipated that one skilled in the art could substitute other types of transistors such as, and not limited to, NPN junction type or point contact N or P types transistors or other types of electronic valve control for the PNP type transistor utilized in the preferred embodiment.

The inputs to the bi-level inverter circuit comprise two levels of logic wherein a first level is arbitrarily designated as a logical "1" and a second level is arbitrarily designated as a logical "0." The inverter circuit is designed to produce a logical "0" output when a logical "1" is applied to any or all of the inputs to the circuit. Also, the circuit will produce a logical "1" output when a logical "0" is applied to all of the inputs to the circuit.

In FIGURE 2, the phase inverting amplifier includes a transistor stage TR–1 followed by a transistor stage TR–2. Transistor stage TR–1 has a base 34, emitter 36 and collector 38 and is electrically connected as a grounded emitter stage. Transistor stage TR–2 has a base 44, emitter 46 and collector 48 and is connected as an emitter follower stage.

In FIGURE 2, an input signal is applied between input terminal 11*a*, 11*b* or 11*c* and ground terminal 12. The input signal is applied through a well known type of diode coupling circuit each including a non-linear diode 15*a*, 15*b* or 15*c*. The input is thereby applied, through input signal current limiter impedance 16 to a non-linear input network 25 comprising non-linear diodes 26, 27, 29 and 30. The input signal is taken from the network at point 32 and applied to TR–1 transistor base 34. The non-linear input network diodes serve as an integral part of a voltage divider network, which network serves to establish the proper D.C. potential biasing for transistor TR–1 operation. This D.C. potential is established from negative B— supply 54 by resistances 24 and 53, the non-linear input network 25, including diodes 26, 27, 29 and 30 and by resistance 33 to the positive B+ supply at terminal 37. The speed-up capacitor 31 on the input of the first stage bypasses the limiter impedance 16 and the non-linear input network 25 during the initial rise or fall of the input signal and secondarily provides additional drive to the base 34 of transistor TR–1 during the input signal transition, thereby speeding the switching of this stage. Collector 38 of TR–1 transistor is connected to the B— supply at terminal 54 by means of resistances 51 and 52. Base 44 of TR–2 is connected to collector 38, which connection provides a control of the base 44 of TR–2 by the collector 38 of TR–1. The emitter 46 of TR–2 is also connected to collector 38 of TR–1 by means of diode 45, which diode insures a back bias between emitter 46 and base 44 of TR–2 under certain operating conditions as will be discussed. Collector 38 is thereby connected to output terminal 13 via diode 45. Collector 48 of TR–2 is connected to the B— supply at terminal 54 by means of resistance 50.

The non-linear feedback circuit 20 accomplishes feedback through either one of two high speed diodes 22 or 23 which have very low stored charge characteristics. These characteristics greatly increase the initial switching speed by not delaying the feedback signal. The diode 23 of the first feedback path has its anode connected to the output terminal via feedback line 40 at terminal point 55. The cathode of diode 23 is connected to the input network 25 at point 28. A function of the feedback path employing diode 23 is to keep the transistor TR–1 out of saturation. The diode 22 in the other feedback path has its cathode connected to the collector 38 of transistor TR–1 at point 39. The anode of diode 22 is connected to the input network 25 at point 17 by means of resistance 24. A function of this second feedback path employing diode 22 is to keep transistor TR–1 from cutting off. Another function is to keep the output voltage of transistor TR–2, while the latter is conducting, clamped at a fixed voltage level as will be described. In the operation of this circuit, transistor TR–1 is conducting at all times.

The output from the bi-level inverter circuit appears between output terminal 13 and ground terminal 14. The output terminal, which is subsequently connected to some electrical load, supplies current constantly to or from the load from the output terminal 13 primarily to prevent the floating of the output which occurs in the absence of current flow.

FIGURE 3 is graphically illustrates the relationship between input voltage *e* and output voltage E in the preferred over-all circuit embodiment of FIGURE 2.

In FIGURE 2, the preferred circuit parameters are chosen so that if an input signal voltage of —5.8 volts is applied between any one of the inputs 11*a*, 11*b* or 11*c* and ground terminal 12, a —1.1 volt output voltage E will be produced between terminal 13 and ground terminal 14. Conversely, if a control input signal voltage of —1.1 volts is applied between all of the inputs 11*a*, 11*b* and 11*c* and ground terminal 12, a —5.8 volt output voltage E will be produced between terminal 13 and ground terminal 14. It can be seen from the curve that there are two broad ranges of input. The input signals, the magnitudes of which are within the first range, all produce an output signal of one value. Conversely, the input signals of magnitudes lying within a second range all produce an output signal of another value. For purposes of discussion hereinafter, a voltage level of —1.1 volt will arbitrarily be designated as a logical "0" and a voltage level of —5.8 volts will be a logical "1." Accordingly, if all of the inputs are logical "0's," the output is a logical "1" and if any input is a logical "1," the output is a logical "0."

The potentials and biases applied to transistors TR–1 and TR–2 and the negative feedback paths as described hereinbefore are of such values that when one of the input voltages is a logical "1," the bi-level inverter will switch its state, changing a logical "1" output to a logical "0" output.

Referring to FIGURE 2, utilizing the selected circuit parameters to achieve the output voltages set out above, the non-linear input network 25 establishes a relatively constant voltage level of approximately —3 volts at point 17. Thus the input signal must be more negative than —3 volts before the bi-level inverter is capable of switching its state. A "1" input referenced by a voltage level of —5.8 volts, is of sufficient negative voltage to overcome this relatively constant voltage thereby causing the switching to occur.

The operation of the bi-level circuit is controlled by means of negative feedback. The feedback is applied to the non-linear input network 25, which network may be considered as a current node. According to Kirchoff's law, the sum of the currents into and out of the node is always equal to zero. Considering now the non-linear input network 25 of FIGURE 2 and assuming the supply voltage and component values listed at the end of the specification, the currents which may flow into or out of this node include the following:

(a) Current flowing out of resistance 33 into the node
(b) Current flowing out of the node into resistance 24
(c) Current flowing out of base 34 of TR–1 into the node
(d) Current flowing into the node through feedback diode 23
(e) Current flowing out of the node through resistance 16

Refer first to the non-linear input network 25 and only the currents flowing through resistances 33, 24 and 53. These elements constitute a voltage divider of such a nature that in the absence of other current paths, point 32 tends to seek an operating voltage of approximately +3 volts.

Now assume point 32 connected to base 34 of TR–1 and also assume that diode 22 is connected between point 41 and point 39. The resulting polarity and magnitude of the voltage applied at base 34 will tend to cause transistor TR–1 to be less conductive. When transistor TR–1 tends to be less conductive, its collector 38 will tend to approach the negative supply voltage point 54. As the collector 38 of transistor TR–1 approaches the supply voltage 54, the cathode of diode 22, connected to the collector 38 at point 39, becomes more negative than its anode. Thereafter, since the diode becomes forwardly biased and conducts, the non-linear input network is driven more negative in voltage. As a result of the negative-going voltage, point 32 and base 34 of the transistor TR–1 becomes more negative. Eventually by means of this process, base 34 of transistor TR–1 becomes more negative with respect to ground. As base 34 of TR–1 becomes more negative with respect to ground, the transistor TR–1 begins to conduct more heavily. Subsequently the collector voltage of transistor TR–1 assumes a stabilized value as a result of the continuing feedback process.

In the stabilized condition, the base current of transistor TR–1 is precisely that value necessary to provide the collector current corresponding to the stabilized voltage of collector 38.

Under the above condition, Kirchoff's law still applies and the sum of the currents into the non-linear input network 25 from resistance 33 and base 34 of TR–1 equals the currents flowing from the non-linear network 25 through resistance 24. The required base current of TR–1 is provided by the current flow through resistance 24.

An additional current path is provided from the non-linear input network 25 by resistance 16. If any, or all, of the inputs become more negative than point 17, current is caused to flow through resistance 16. As the current flows through resistance 16, a switching action of the bi-level inverter is initiated, which eventually results in a second stabilized output voltage. The increase in current from the non-linear input 25 passing through resistance 16 results in a momentary increase in base current of transistor TR–1.

As a result of the increased base current of transistor TR–1, the collector current of this transistor is increased. The increased collector current causes the collector voltage and point 39 to become more positive. As point 39 becomes more positive, diode 22 ceases to conduct because the cathode becomes more positive than the anode whereby the diode 22 becomes back-biased.

If the magnitude of the current passing through resistance 16 is large enough, the current flowing through diode 22 becomes zero. As the current through resistance 16 increases beyond this point there exists an excess of base current in order to satisfy Kirchoff's law. Therefore, transistor TR–1 begins conducting more heavily.

Under the above conditions the switching action continues. Point 39 continues to move in a positive direction towards ground potential. Points 13, 55 and line 40 are forced to follow the positive-going voltages of points 38 and 39 because of the conduction through the forwardly biased diode 45. As the switching action continues, line 40 eventually becomes more positive than point 28 of the non-linear input network 25. The diode 23 is thereby forwardly biased and begins to conduct.

According to Kirchoff's law, as the conduction current through diode 23 increases, the base current from transistor TR–1 decreases and eventually the second stable state is reached.

Non-linear diodes 26 through 30 in the input network are used to establish a relatively constant D.C. level and this operating voltage is dependent upon the diodes' forward voltage drop characteristics. The diodes used in this network are of a type which exhibit low dynamic impedance characteristics and which thereby cause little power attenuation of the input signal. While transistor TR–1 is conducting, non-linear feedback diodes 22 and 23 function to limit the dynamic operating range of the transistor to that region in which the transistor operates at highest gain and in which the electrical characteristics are essentially linear. This results in transistor operation over a relatively small dynamic range of the over-all electrical characteristics.

The operation of the non-linear diodes 22 and 23 in conjunction with the non-linear input circuit 25, which combination results in the regulation of the transistors, can be best understood by assuming the following situation. The output operating voltage appearing at the output point 13 and point 55 is applied via line 40 to the non-linear input network 25 at point 28. If the output operating voltage of points 13 and 55 increases becoming positive with respect to the operating voltage of point 28, which condition exists when the transistor TR–1 conduction approaches saturation, the feedback voltage is such that diode 23 will become conductive. When diode 23 conducts in the forward direction, this low impedance state in effect connects the over-all circuit output terminal point 13 to point 28, which is substantially equivalent to connecting the over-all output to the input. Since diodes 26 and 27 are biased in their low impedance direction, the effect of the feedback is to make the non-linear input network more positive which thereby tends to decrease the conduction of the transistor TR–1 thus keeping operation within the dynamic range. Summarizing, a positive increase in output operating voltage at terminal 13 will cause the operating voltage of the entire input network 25 to become more positive thereby subtracting or reducing the current in the input network 25.

Considering the condition in which the output operating voltage at points 13 and 55 goes negative with respect to the operating voltage at point 28, a feedback voltage is established at which diode 23 will become back-biased and cease to conduct. When point 13 goes more negative the collector current flow through transistor TR–1 will decrease, which results in a smaller voltage drop across resistances 51 and 52 which thereby tends to drive the potential of point 39 negative with respect to point 17. The feedback voltage is such that diode 22 then becomes forwardly biased causing conduction in the forward direction. As diode 22 conducts, the input network becomes more negative thereby increasing the conduction of transistor TR–1. Summarizing, a negative increase in output operating voltage at point 13 will cause the input network 25 to draw more current, causing the voltage at point 32 to become more negative, and thereby increase the conduction of current through TR–1. This increase of current through TR–1 causes the voltage at point 39 and point 13 to become more positive, returning the output voltage to its stable level.

The input network, including diodes which exhibit non-linear characteristics, is a substantial improvement over conventional linear resistances due to the fact that the input and feedback signals impressed upon the input network are responded to more effectively since a portion of the signal is not distributed across a linear resistance within the input network and since the diodes conduct in the low impedance forward direction. Therefore an input signal is substantially applied upon, and thereby influences, the entire input network in toto and not segmentally. A further improvement obtained is the speed at which the input network can respond to the feedback signal thereby bringing operation within the determined dynamic operating range. The response speed is thereby dependent upon the non-linear low forward impedance of the elements of the input network. The input network generally adds or subtracts the feedback signal within the network and then applies the resulting input signal to bias the operation of transistor TR–1.

Assuming a stable supply voltage between B− and B+ of forty volts and utilizing the component values listed at the end of this specification, the circuit of FIGURE 2 includes the large voltage dividing network means, including resistors 53, 24 and 33 and the non-linear input network 25, which network is connected between the B+ supply at terminal 37 and the B− supply at terminal 54. Current is drawn through this dividing network from terminal 54 to the B+ supply at terminal 37. In the absence of any input voltage to terminals 11*a*, 11*b* or 11*c*, the circuit constants are such that the voltage with respect to ground at point 32 is approximately −.3 volt. When point 32 is at approximately −.3 volt, the circuit is in steady-state condition. Point 32 at the base 34 of transistor TR–1 is slightly negative with respect to ground, transistor TR–1 base 34 is biased with respect to emitter 36 sufficiently to keep transistor TR–1 conducting lightly.

Consider the case where transistor TR–1 is conducting and diode 45 is forwardly biased. The bias between the emitter 46 and base 44 of transistor TR–2 keeps the transistor from conducting. If the output operating voltage at point 13 becomes sufficiently less negative, it will cause diode 45 to become back-biased; and the emitter 46 of TR–2 will become sufficiently positive with respect to the base 44 to allow the emitter follower stage TR–2 to conduct. During this time the transistor TR–2 passes current from the output terminal 13 to the −20 volt supply. When the operating voltage at point 13 becomes of a value to forwardly bias diode 45, the transistor TR–2 then becomes non-conductive since the bias between the emitter 46 and base 44 is in the reverse direction.

When transistor TR–1 is conducting heavily and diode 45 is forwardly biased, the current is flowing out of the inverter at point 13 to the electrical load. The output voltage of the bi-level inverter is at the −1.1 volt level. If the voltage at point 13 becomes more positive than the −1.1 volt output voltage because of an external circuit condition, the cathode of diode 45 will become more positive than the anode, causing diode 45 to become back-biased. When diode 45 becomes back-biased, the emitter 46 of transistor TR–2 becomes sufficiently positive with respect to base 44 to allow transistor TR–2 to conduct current from the output terminal 13 to the −20 volt supply. When the external circuit condition which caused the voltage at point 13 to become more positive than the −1.1 volt output voltage is removed, diode 45 becomes forwardly biased, removing the bias between the emitter 46 and base 44 of transistor TR–2 thereby causing transistors conduction current to be cut off.

When transistor TR–1 is conducting, the non-linear feedback circuit functions to limit the dynamic operating range as heretofore described. If during conduction, transistor TR–1 approaches saturation and thereby drives points 13 and 55 positive with respect to point 28, diode 23 begins to conduct tending to make point 28 more positive. As point 28 becomes more positive, the potential of the input network becomes more positive thereby decreasing the current flowing in the input network. Since the input network becomes more positive, point 32 and subsequently base 34 are driven positive. As base 34 becomes more positive with respect to emitter 36, the conduction current is decreased thereby keeping the transistor out of saturation.

If during conduction the transistor approaches cut-off, the collector 38 tends to become more negative and subsequently makes point 39 more negative with respect to point 17. Diode 22 will then be biased in the forward direction and will begin to conduit. As diode 22 conducts, an incremental increase of current through the input network 25 produces a larger volt drop across the entire network. Since the input network becomes more negative, point 32 and base 34 become more negative. As base 34 becomes more negative with respect to emitter 36, the conduction current increases to prevent the transistor cutoff.

When the bi-level inverter is receiving an input of a logical "1," the output is a logical "0." When the input signal is changed from a logical "1" to a logical "0" the inverter must subsequently switch its output level, that is, from a logical "0" to a logical "1." Assume that the input is changed from the logical "1" to a logical "0." A voltage input level of −1.1 volts, which voltage level designates a logical "0," is applied to all input terminals 11*a*, 11*b* and 11*c*. This voltage drives the input network more positive thereby rendering point 32 and base 34 less negative. As base 34 becomes positive with respect to emitter 36, transistor TR–1 collector current decreases. As transistor TR–1 collector current decreases, collector 38 then begins to approach −20 volts, the B− supply voltage. Since the voltage at the output 13 which is supplying a load cannot change as quickly as the collector 38 voltage, the series output diode 45 is back-biased thereby increasing the potential difference between base 44 and emitter 46 of transistor TR–2. When the potential difference becomes sufficient, transistor TR–2 is allowed to conduct. The rate at which the transistor TR–2 current increases is dependent upon how quickly the current through transistor TR–1 decreases. The transistor TR–2 current flows to the B− supply at terminal 54, through resistance 50 and through the transistor from the output terminal 13. As transistor TR–2 conducts, the output voltage is driven toward the −5.8 volt level. As the inverter circuit approaches this level, the output voltage will overshoot the voltage level due the delays associated within the circuit. To compensate for this overshoot, a clamping action is initiated to settle and stabilize the voltage back at the −5.8 volt level. This clamping action will now be described. Since base 44 of transistor TR–2 is controlled by the voltage impressed upon the collector 38 of transistor TR–1, when the overshooting occurs point 39 will be negative with respect to point 41 thereby biasing diode 22 in the forward direction. When diode 22 conducts, an incremental increase in current is drawn through resistance 24. The incremental increase in currrent causes a voltage drop across the input network tending to make it more negative. As the input network 25 becomes more negative, point 32 and subsequently base 34 become more negative. As base 34 becomes more negative with respect to emitter 36, a larger current will then flow through transistor TR–1. This current flow will tend to make base 44 of transistor slightly more positive to thereby reduce the overshoot of the output operating voltage and to clamp the output signal at −5.8 volts. When the circuit stabilizes, transistor TR–1 is conducting lightly.

When the inverter has switched its state from a logical "0" output to a logical "1" output, the input network 25 performs an additional function. Since the input signal to diodes 15*a*, 15*b* and 15*c* is at a −1.1 volt level, the input network 25 establishes a relatively constant voltage level of −3 volts thereby stabilizing point 17 at approximately −3 volts. Since point 17 is connected to the anode of 15*a*, 15*b* and 15*c* via resistance 16, the diodes 15*a*, 15*b* and 15*c* are each back-biased thereby insuring that a signal greater than the established voltage level is necessary to effect a change of state.

FIGURE 4 illustrates the use of two bi-level circuits connected so as to form a bi-stable flip-flop. The flip-flop comprises two bi-level inverter circuits B–1 and B–2 whereby each circuit comprises the portion designated as 10 in FIGURE 2. Each circuit has a plurality of input diodes, which configuration and operation will be explained hereinafter. Output terminals 13*a* and 13*b* and output signal lines 70 and 71 transmit the output signal to the input diodes of the successive bi-level inverter circuit. As stated previously, each bi-level inverter circuit has a single output terminal, the purposes and utilization of which will be discussed hereinafter.

The general operation of a flip-flop comprised of bi-level inverter circuits will first be discussed. Assume a pulsed "1" input into the diode logic 15*b* via input 11*c*, into inverter circuit B–1, which circuit will then produce a logical "0" output on terminal 13*a*. The logical "0" is carried via line 70 and is applied to the input of inverter circuit B–2 at input point 11*h* and through diode 15*f*. The output of inverter circuit B–2 is a logical "1" which appears at output terminal 13*b*. The logical "1" output is carried via line 71 and is applied as an additional input to inverter circuit B–1. Thus the flip-flop insures a bi-stable state by means of producing an additional steady state input into inverter circuit B–1.

Since the basic operation of the flip-flop comprising bi-level inverter circuits has been described, it is necessary to discuss the operation of the diode logic which determines the inputs to each inverter circuit. Diodes 15*a*, 15*b* and 15*c* of inverter B–1 and diodes 15*d*, 15*e* and 15*f* of inverter circuit B–2 are connected so as to form logical OR inputs. A logical "1" input to the cathode of any of the above diodes will pass a "1" input into the bi-level circuit. This can readily be shown by noting that the anode is held at a −3.0 volts before diode conduction within the bi-level circuit, and further when a logical "1"

input, which is a voltage level of —5.8 volts, is applied to the cathode, the diode becomes forwardly biased and thereby conducts. Summarizing, whenever a single OR diode conducts, this functions to provide a logical "1" input. Conversely, if all inputs applied to the cathodes are logical "0," or a voltage level of —1.1 volts, the anode is held at —3 volts thereby applying a reverse bias upon the diodes, keeping them from conducting. When all the OR diodes are not conducting, this functions to provide a logical "0" input.

Now consider the addition of an AND input to one of the OR diodes providing cascaded logical operations as shown in FIGURE 4. Diode 15*a*, an OR input to inverter circuit B–1, includes an AND input comprising inputs 11*a*, 11*b*, diodes 9*a* and 9*b*, a load dropping resistance 8*a* and supply source B— shown at terminal 54*a*. Also OR diode 15*d* input to inverter circuit B–2 has an AND input comprising inputs 11*e*, 11*f*, diodes 9*c* and 9*d*, a load dropping resistance 8*b*, and a supply source B— shown at terminal 54*b*.

Considering the AND input to inverter circuit B–1, if logical "0's" appear at 11*a* and 11*b*, a voltage level of —1.1 volts is applied to the anodes of 9*a* and 9*b*. Since the anodes are more positive than the cathodes, diodes 9*a* and 9*b* are forwardly biased, and they thereby pass current through load drop resistance 8*a* and the B— supply terminal 54*a*. The voltage drop across resistance 8*a* is such that the cathode of 15*a* is held at approximately —1.1 volts, which thereby applies a reverse bias on diode 15*a*. The reverse bias keeps diode 15*a* from conducting to thereby provide a logical "0" input to B–1. Now assume that input 11*a* receives a logical "1." This applies a voltage level of —5.8 volts to the anode of diode 9*a*. Since the anode of diode 9*b* is still at a —1.1 volt level, diode 9*b* will continue conducting and keep the cathode of 9*a* at a —1.1 volt level, thereby back-biasing diode 9*a* making it non-conductive. Since the diode 9*b* is conducting, the cathode of 15*a* is retained a —1.1 volts thereby maintaining it non-conductive and the circuit continues to function to apply a logical "0" input to B–1. Assuming that 11*a* and 11*b* both receive logical "1's," or —5.8 volts, both diodes 9*a* and 9*b* are rendered nonconductive. Current now flows through load dropping resistance 8*a* and diode 15*a* is forward-biased. When diode 15*a* conducts, this functions as logical "1" input to the bi-level inverter circuit.

The configuration of providing combinations of AND inputs with OR inputs comprise what is known as double level diode logic. The advantage of this array includes the performing of cascaded logical functions at the inputs to the bi-level circuits. Each bi-level circuit has only a single output, such as 13*a* from bi-level circuit B–1 in FIGURE 4, and that output is transmitted to an appropriate input terminal of a successive stage. If more than one inverter circuit requires an input from a given inverter circuit, this additional input is obtained at the input terminal of the first inverter to which the output is connected. The primary purpose of the single output line in contrast with output schemes with multiple output lines is to reduce the line capacitance which must be charged and discharged during transient voltage excursions thereby allowing faster inverter switching. If parallel output lines were extended from the inverter circuit output, the increased current would tend to decrease the switching time of the inverter circuit.

Again, referring to FIGURE 4, if logical "1's" are applied to the AND inputs 11*a* and 11*b*, this properly conditions the OR diode 15*a* thereby passing a logical "1" input to inverter circuit B–1. The logical "0" appearing at output terminal 13*a* is transmitted via line 70 to an OR input 11*h*. The logical "1" appearing at output terminal 13*b* of inverter circuit B–2 is transmitted via line 71 to an OR input 11*d* thereby passing a second logical "1" input into inverter circuit B–1. If subsequently the logical "1's" applied to the AND inputs are removed, the flip-flop will remain set in this state because a second OR input is applying a logical "1" to the inverter circuit B–1. The flip-flop can only be cleared by eliminating the second logical "1" input to inverter circuit B–1. This is accomplished by applying a logical "1" input to inverter circuit B–2 via the double level diode logic input, which input then causes a logical "0" to be applied to inverter circuit B–1. This bi-stable flip-flop can be used to store or hold information by the setting and subsequent clearing of the device. The state of the flip-flop can be easily determined at any time by detecting the output of inverter circuit B–2; that is, if a logical "1" set the flip-flop, the output of inverter circuit B–2 will be a logical "1." Conversely, if the flip-flop is cleared by a logical "1" input to inverter circuit B–2 with no signal input to inverter circuit B–1, the output of inverter B–2 will be a logical "0."

It is anticipated that the flip-flop of FIGURE 4 or any uses of the bi-level inverter circuit, including the use of double diode logic input configuration to each, may be expanded and modified by one skilled in the art to provide several combinations and uses, all of course, to be within certain limitations of the circuit such as the maximum number of individual inputs to any single AND input, which limitations affect the response time of the inverter circuits.

For the purpose of illustrating suggested parameters for the disclosed embodiments of the present invention, the following list of components is provided, it being understood that the invention is not limited thereto:

In FIGURE 2,

Resistor 16 is 1200 ohms.

Resistor 24 is 1800 ohms.

Resistor 33 is 16000 ohms.

Resistor 50 is 470 ohms.

Resistors 51 and 52 are 3900 ohms.

Resistor 53 is 18000 ohms.

Capacitor 31 is 22 micromicrofarads.

Diodes 15*a*, 15*b*, 15*c* and 45 are Hughes HD2969 germanium type "CF" diodes.

Diodes 26, 27, 29 and 30 are Hughes HD4416 silicon type "CB" diodes.

Diodes 22 and 23 are Fairchild FD1032 silicon type "CA" diodes.

Transistor TR–1 is a basis transistor similar to a 2N964.

Transistor TR–2 is a basic transistor similar to a 2N960.

The voltage supply is ±20 v. D.C.

In FIGURE 4,

Resistors 8*a* and 8*b* are each 12000 ohms.

Diodes 9*a*, 9*b*, 9*c* and 9*d* are Hughes HD2969 germanium type "CF" diodes.

It will also be understood that any appropriate phase inverting device may be utilized with the inventive bi-level inverter circuit.

The above illustrative embodiments comprise preferred embodiments of the invention. However, these illustrations are not intended to limit the possibilities of insuring the features of the improved bi-level inverter circuit and compound circuits which can be assembled therefrom. The basic inverting circuit disclosed herein is an example of an arrangement in which the inventive features of this disclosure may be utilized and it will become apparent to one skilled in the art that certain modifications may be made within the spirit of the invention as defined by the appended claims.

What is claimed is:

1. A circuit arrangement capable of rapid switching action and of inverting input voltages comprising: an input network including a plurality of non-linear elements connected in series; a phase inverting direct current amplifier having its input connected to one point in said input network; a first negative feedback path conducting direct current from said amplifier to the input network when the output voltage of the circuit reaches a predetermined first level, thus controlling the input current to said amplifier at a value which prevents the amplifier from saturating and which holds the output voltage of the circuit at a first prescribed level; and a second negative feedback path conducting direct current from said amplifier to the input network when the output voltage of the circuit reaches a predetermined second level, thus controlling the input current to said amplifier at a value which prevents the amplifier from cutting-off and which holds the output voltage of the circuit at a second prescribed level; said first and second feedback paths being connected to separate additional points in said input network, each of the three points being separated by at least one element of the input network.

2. A circuit arrangement as set forth in claim 1, wherein the elements of said non-linear input network include at least one diode.

3. A circuit arrangement as set forth in claim 1, wherein each of said feedback paths includes a non-linear device.

References Cited by the Examiner

UNITED STATES PATENTS

| | | | |
|---|---|---|---|
| 3,092,729 | 6/1963 | Cray | 307—88.5 |
| 3,218,472 | 11/1965 | Ruoff | 307—88.5 |

OTHER REFERENCES

Pub. I, "Resistor Diode Inverter Logic Circuit," by Antipov in IBM Technical Disclosure Bulletin, vol. 4, No. 1, dtd. June 1961, pp. 38 and 39.

ARTHUR GAUSS, *Primary Examiner.*

S. D. MILLER, *Assistant Examiner.*